United States Patent
Shen

(10) Patent No.: US 12,127,235 B2
(45) Date of Patent: Oct. 22, 2024

(54) METHOD FOR PROCESSING CSI, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 295 days.

(21) Appl. No.: 17/564,449

(22) Filed: Dec. 29, 2021

(65) Prior Publication Data

US 2022/0124744 A1  Apr. 21, 2022

Related U.S. Application Data

(63) Continuation of application No. PCT/CN2019/102640, filed on Aug. 26, 2019.

(51) Int. Cl.
*H04W 72/542* (2023.01)
*H04W 72/1263* (2023.01)

(52) U.S. Cl.
CPC ..... *H04W 72/542* (2023.01); *H04W 72/1263* (2013.01)

(58) Field of Classification Search
None
See application file for complete search history.

(56) References Cited

U.S. PATENT DOCUMENTS

| 2014/0044069 | A1* | 2/2014 | Bao | H04B 7/0689 |
| | | | | 370/329 |
| 2017/0099616 | A1 | 4/2017 | Tong et al. | |
| 2018/0091272 | A1 | 3/2018 | Wang et al. | |
| 2018/0248599 | A1* | 8/2018 | Onggosanusi | H04B 7/0626 |
| 2018/0367192 | A1 | 12/2018 | O'Shea et al. | |
| 2019/0372704 | A1* | 12/2019 | Wang | H04B 7/0632 |
| 2020/0304183 | A1* | 9/2020 | Chen | H04L 1/00 |

FOREIGN PATENT DOCUMENTS

| CN | 106033990 | 10/2016 |
| CN | 106685582 | 5/2017 |
| WO | 2009023850 | 2/2009 |

(Continued)

OTHER PUBLICATIONS

"UE Selected Generic Format Indicator for CSI Feedback in NR", AT&T, 3GPP TSG RAN WG1 Meeting #87, R1-1612369, Nov. 17, 2016 (Year: 2016).*

(Continued)

*Primary Examiner* — Jenkey Van
(74) *Attorney, Agent, or Firm* — Hodgson Russ LLP

(57) ABSTRACT

A method for processing channel state information (CSI) is provided. The method includes: a terminal device generates CSI indication information based on a CSI indication information type; the terminal device transmits information, where the information is used for a network device to determine the CSI indication information and the CSI indication information type. A method for processing CSI, an electronic device, and a storage medium are further provided.

9 Claims, 7 Drawing Sheets

(56) References Cited

FOREIGN PATENT DOCUMENTS

| WO | 2009096708 | 8/2009 |
| WO | 2011041759 | 4/2011 |
| WO | 2018091072 | 5/2018 |

OTHER PUBLICATIONS

AT&T, "UE Selected Generic Format Indicator for CSI Feedback in NR," 3GPP TSG RAN WG1 Meeting #87, R1-1612369, Nov. 2016.
EPO, Extended European Search Report for EP Application No. 19942988.7, May 19, 2022.
WIPO, International Search Report for International Application No. PCT/CN2019/102640, May 6, 2020.
EPO, Communication for EP Application No. 19942988.7, Jun. 25, 2024.

* cited by examiner

INPUT LAYER    HIDDEN LAYER    OUTPUT LAYER

| FIRST INDICATION INFORMATION M | CSI INDICATION INFORMATION TYPE N |
|---|---|
| M1 (00) | N1 (L=32, R=16) |
| M2 (01) | N2 (L=16, R=8) |
| M3 (10) | N3 (L=8, R=4) |
| M4 (11) | N4 (L=4, R=2) |

FIG. 8

| FIRST INDICATION INFORMATION M | CSI INDICATION INFORMATION TYPE N |
|---|---|
| M1 (00) | N1 (FIRST SET OF SECOND PARAMETERS) |
| M2 (01) | N2 (SECOND SET OF SECOND PARAMETERS) |
| M3 (10) | N3 (THIRD SET OF SECOND PARAMETERS) |
| M4 (11) | N4 (FOURTH SET OF SECOND PARAMETERS) |

FIG. 9

| CSI | CSI INDICATION INFORMATION TYPE Q | FIRST INDICATION INFORMATION M |
|---|---|---|
| P1,SINR>=X1 | Q1 | M1 (00) |
| P2,X1>SINR>=X2 | Q2 | M2 (01) |
| P3,X2>SINR>=X3 | Q3 | M3 (10) |
| P4,X3>SINR | Q4 | M4 (11) |

FIG. 10

METHOD FOR PROCESSING CSI, TERMINAL DEVICE, AND NETWORK DEVICE

CROSS REFERENCE TO RELATED APPLICATION(S)

This application is a continuation of International Application No. PCT/CN2019/102640, filed on Aug. 26, 2019, the entire disclosure of which is incorporated herein by reference.

TECHNICAL FIELD

This disclosure relates to the technology field of wireless communication, and particularly relates to a method for processing channel state information (CSI), a terminal device and a network device.

BACKGROUND

A user equipment (UE) can send channel state information (CSI) to a network device. In terms of the type of the CSI generated by the UE and how to recover the CSI accurately by the network device through CSI indication information, there is no effective solution.

SUMMARY

Disclosed herein are implementations of a method for processing channel state information (CSI), a terminal device, and a network device.

In a first aspect, a method for processing CSI is provided in implementations of the disclosure. The method includes: a terminal device generates CSI indication information based on a CSI indication information type; the terminal device transmits information, where the information is used for a network device to determine the CSI indication information and the CSI indication information type.

In a second aspect, a terminal device is provided in implementations of the disclosure. The terminal device includes a transceiver, a processor, and a memory storing computer programs. The computer programs, when executed by the processor, are operable with the processor to generate CSI indication information based on a CSI indication information type, and operable with the transceiver to transmit information, where the information is used for a network device to determine the CSI indication information and the CSI indication information type.

In a third aspect, a network device is provided in implementations of the disclosure. The network device includes a transceiver, a processor, and a memory storing computer programs. The computer programs, when executed by the processor, are operable with the transceiver to receive information, and operable with the processor to determine CSI indication information and a CSI indication information type according to the information.

BRIEF DESCRIPTION OF THE DRAWINGS

FIG. 8 is still another schematic diagram illustrating the first correspondence according to implementations of the disclosure.

FIG. 9 is a schematic diagram illustrating a second correspondence according to implementations of the disclosure.

FIG. 10 is a schematic diagram illustrating a first mapping according to implementations of the disclosure.

DETAILED DESCRIPTION

In order to understand the characteristics and technical contents of implementations of the disclosure in more detail, the implementations of the disclosure are described in detail below in combination with the accompanying drawings. The accompanying drawings are for reference and explanation only and are not intended to limit the implementations of the application.

Let's start with a brief description of channel state information (CSI) before describing a method for processing CSI according to implementations of the disclosure.

Figure 1:
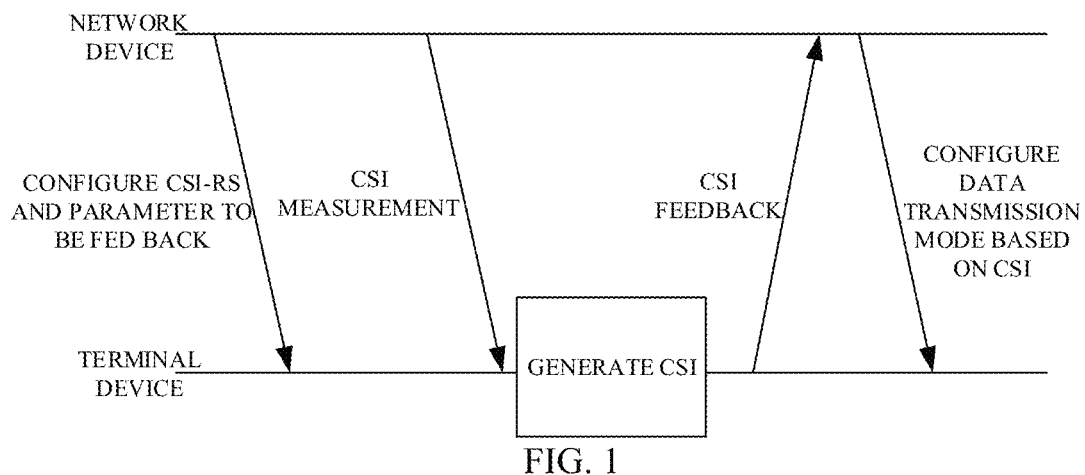
FIG. 1 is a schematic flowchart illustrating a process in which a terminal device feeds back CSI indication information according to implementations of the disclosure.

CSI feedback from a terminal device to a network device plays an important role in long term evolution (LTE) system and new radio (NR) system. CSI determines the performance of multiple-input multiple-output (MIMO) transmission. Generally, the terminal device feeds back CSI by transmitting CSI indication information to the network device. The CSI indication includes one or more of channel quality indication (CQI), precoding matrix indication (PMI), and rank indication (RI). FIG. 1 illustrates the process in which the terminal device feeds back the CSI indication information. As illustrated in FIG. 1, the network device configures a CSI reference signal and a parameter to be fed back for the terminal device. The CSI reference signal is used for CSI measurement, and may include synchronization signal block (SSB) and/or CSI reference signal (CSI-RS). The parameter to be fed back is one or more of CQI, PMI, and RI that required to be fed back to the network device by the terminal device. The terminal device can determine the CSI by measuring the CSI-RS. The terminal device feeds back CSI indication information representing the CSI to the network device. According to the CSI indication information, the network device can acquire corresponding CSI and configure a data transmission mode for the terminal device according to the CSI acquired.

Figure 2:
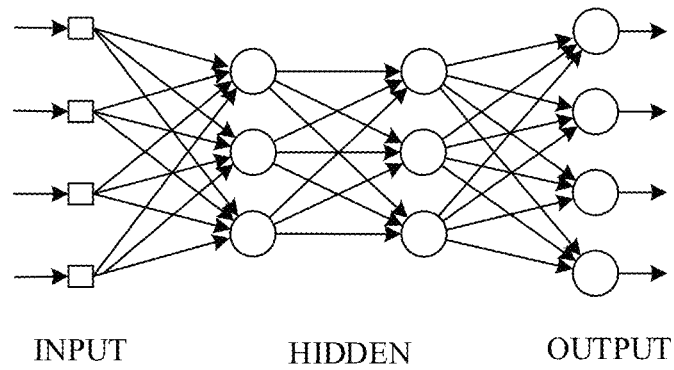
FIG. 2 is a schematic structural diagram illustrating a basic neural network model according to implementations of the disclosure.

The neural network model is briefly described below. The basic structure of the basic neural network model is shown in FIG. 2, As illustrated in FIG. 2, the neural network model includes an input layer, a hidden layer, and an output layer. The input layer is responsible for receiving data, the hidden layer processes the data received by the input layer, and the output layer is used to output results of data processing. Each node in the neural network model represents a processing unit. Each processing node can be regarded as simulating a neuron, and multiple neurons form a layer of neural network. A whole neural network model is constructed through multi-layer information transmission and processing.

Figure 3:
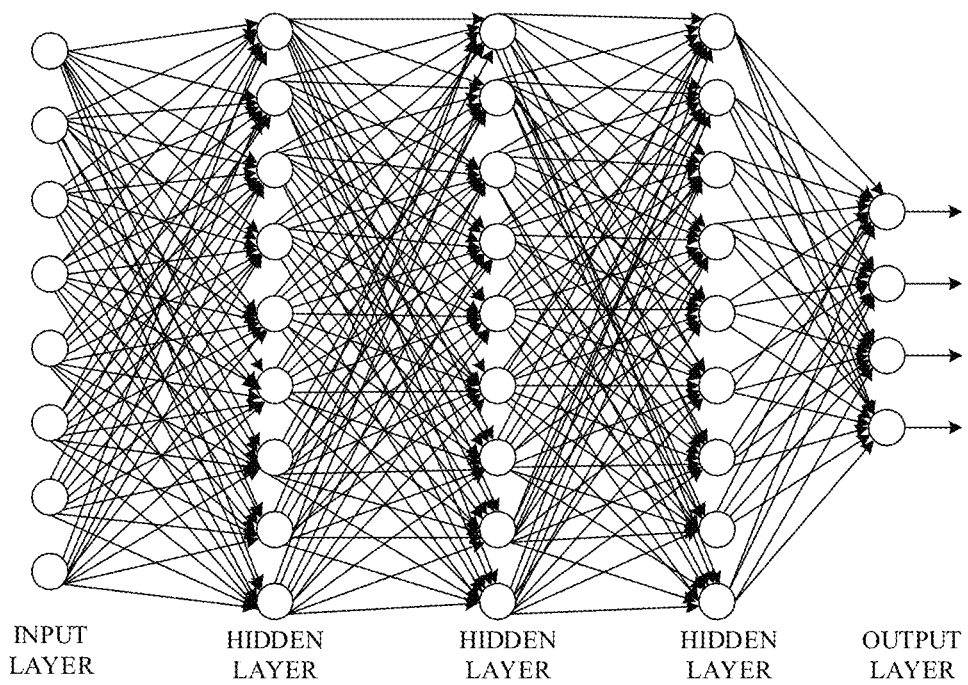
FIG. 3 is a schematic structural diagram illustrating a deep neural network model according to implementations of the disclosure.

With the continuous in-depth study of the neural network model, a deep neural network model is proposed. The structure of the deep neural network model is shown in FIG. 3. Compared with the basic neural network model, the deep neural network model has more hidden layers. By training the neural network model with multiple hidden layers layer by layer, the learning and processing ability of the neural network model is greatly improved. Deep neural network model is widely used in pattern recognition, signal processing, optimal combination, and anomaly detection.

Generally, the acquisition of CSI by the terminal device and the feedback of CSI from the terminal device to the network device are realized based on the traditional basic communication model and the pre-configured feedback parameter set, based on quantization and codebook. However, a quantization and codebook based method usually cannot accurately reflect the actual CSI of the current channel. Especially when large-scale MIMO is introduced, the upper limit of system throughput will be limited.

Based on the above problems, a method for processing CSI in provided in implementations of the disclosure. The method for processing CSI provided herein can be applied to various communication systems, such as global system of mobile communication (GSM) system, code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, advanced long term evolution (LTE-A) system, NR system, evolution system of NR, LTE-based access to unlicensed spectrum (LTE-U) system, NR-based access to unlicensed spectrum (NR-U) system, universal mobile telecommunication system (UMTS), worldwide interoperability for microwave access (WiMAX) communication system, wireless local area networks (WLAN), and wireless fidelity (Wi-Fi).

Generally speaking, the number of connections supported by traditional communication systems is limited and easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, etc., implementations of the disclosure can also be applied to these communication systems.

The system architecture and business scenario described in the implementations of the disclosure are to more clearly explain the technical schemes provided in the implementations, and do not constitute a limitation on the technical schemes. Those skilled in the art can see that with the evolution of network architecture and the emergence of new business scenarios, the technical schemes provided in implementations of the disclosure are also applicable to similar technical problems.

The network device referred to herein can be a normal base station such as Node B (NB), evolved NB (eNB), or next generation NB (gNB), NR controller, centralized unit, NR base station, remote radio module, micro base station, relay, distributed unit, transmission reception point (TRP), transmission point (TP), or any other device. The implementations do not limit the specific technology and specific equipment form adopted by the network device. For convenience of description, in implementations of the disclosure, the above devices providing wireless communication functions for terminal devices are collectively referred to as network devices.

In implementations of the disclosure, the terminal device can be any device. For example, the terminal device may be a user device for machine communication. That is to say, the terminal device can also be referred to as user equipment (UE), mobile station (MS), mobile terminal, or terminal. The terminal device can communicate with one or more core networks via radio access network (RAN). For example, the terminal device may be a mobile phone (or "cellular" phone), a computer with a mobile terminal, etc. For example, the terminal device can also be a portable, pocket, handheld, computer built-in, or vehicle mounted mobile device, which exchanges language and/or data with wireless access networks. There is no specific limitation in the implementations.

Optionally, the network device and the terminal device can be deployed on land, including indoor or outdoor, handheld or vehicle. It can also be deployed on the water surface, or can be deployed on aircraft, balloons and man-made satellites in the air. There is no specific limitation on the application scenario of the network device and the terminal device.

Optionally, communication between the network device and the terminal device and communication between terminal devices can be carried out through licensed spectrum, unlicensed spectrum, or both authorized spectrum and unlicensed spectrum. Communication between the network device and the terminal device and communication between terminal devices can be carried out through a spectrum below 7 gigahertz (GHz), or can be carried out through a spectrum above 7 GHz, or can be carried out through both a spectrum below 7 GHz and a spectrum above 7 GHz. There is no specific limitation on the spectrum resource used between the network device and the terminal device.

Generally speaking, the number of connections supported by traditional communication systems is limited and easy to implement. However, with the development of communication technology, mobile communication systems will not only support traditional communication, but also support, for example, D2D communication, M2M communication, MTC, V2V communication, etc., implementations of the disclosure can also be applied to these communication systems.

Figure 4:
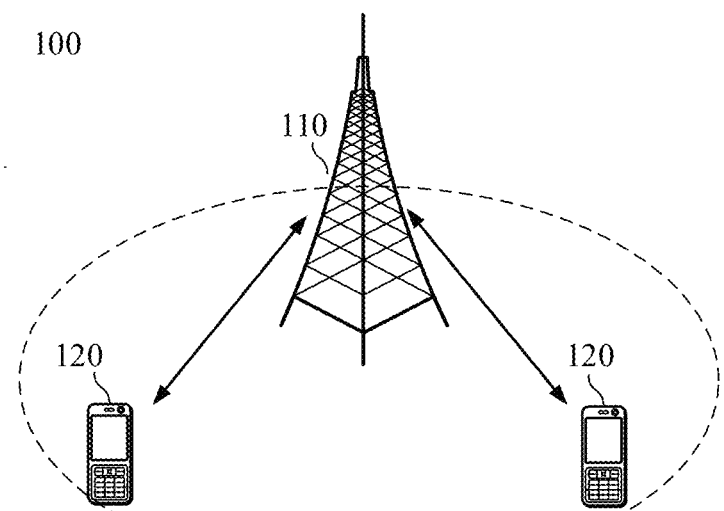
FIG. 4 is a schematic structural diagram illustrating a communication system according to implementations of the disclosure.

Exemplary, a communication system 100 applied in implementations of the disclosure is illustrated in FIG. 4. The communication system includes a network device 110. The network device 110 can be a device in communication with a terminal device 120 (also known as a communication terminal or terminal). The network device 110 may provide communication coverage for a specific geographical area and may communicate with terminal devices located within the coverage area. Optionally, the network device 110 can be a base transceiver station (BTS) in GSM system or CDMA system, or can be an NB in WCDMA system, an eNB (or eNodeB) in LTE system, a wireless controller in cloud radio access network (CRAN). Alternatively, the network device can be a mobile switching center, a relay station, an access point, an on-board device, a wearable device, a hub, a switch, a bridge, a router, a network side device in a 5th generation (5G) network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, internet/intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through D2D communication.

As an example, the 5G system or 5G network can also be referred to as an NR system or NR network.

FIG. 4 exemplarily illustrates one network device and two terminal devices. The communication system 100 may include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

It should be understood that, a device with communication functions in a network/system of implementations can be referred to as a "communication device". Taking the communication system 100 illustrated in FIG. 4 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

Figures 5, 6, 7:
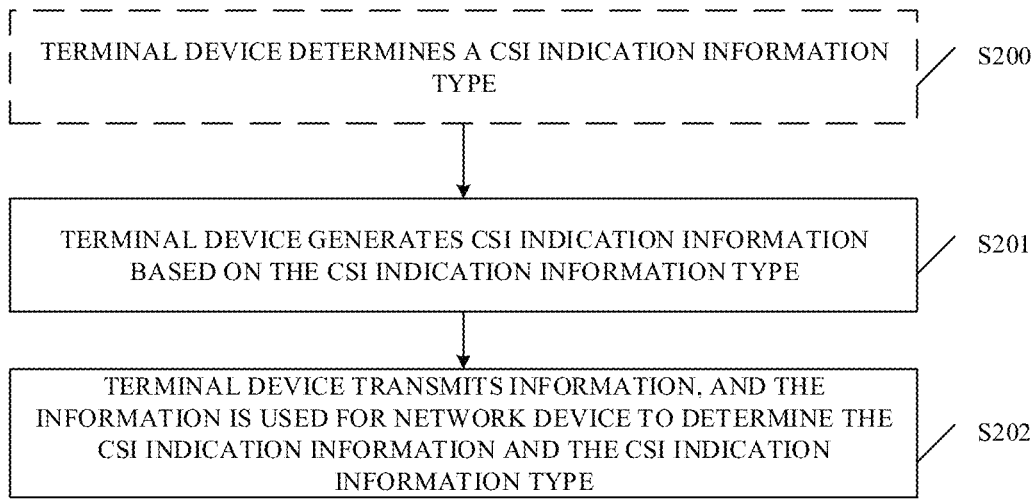
FIG. 5 is a schematic flowchart illustrating a method for processing channel state information (CSI) performed by a terminal device according to implementations of the disclosure.
FIG. 6 is a schematic diagram illustrating a first correspondence according to implementations of the disclosure.
FIG. 7 is another schematic diagram illustrating the first correspondence according to implementations of the disclosure.

FIG. 5 illustrates one possible procedure of a method for processing CSI, which is applied to a terminal device. According to the method, a terminal device generates CSI indication information based on a CSI indication information type, and transmits information, which is used for the network device to determine the CSI indication information and the CSI indication information type. The method allows a network device to know the type of CSI and accurately recover the CSI.

As illustrated in FIG. 5, the method includes the following.

At block S201, a terminal device generates CSI indication information based on a CSI indication information type.

Optionally, the CSI indication information type includes: length of the CSI indication information, or size of a matrix representing the CSI indication information. The CSI indication information is for indicating CSI. The length of the CSI indication information can be the number of bits of the CSI indication information. The size of the matrix representing the channel sate indication information can be the number of rows and/or columns of the matrix.

In some implementations, the terminal device generates the CSI indication information with an encoding model, based on the CSI indication information type. For example, the CSI indication information type is 256 bits, then the length of the CSI indication information generated by the terminal device is 256 bits. Optionally, the encoding model is an encoding neural network model.

In some implementations, when generating the CSI indication information with the encoding model, it is also necessary to determine a first parameter used for constructing the encoding model.

Optionally, the terminal device determines a first parameter corresponding to the CSI indication information type based on a third mapping between CSI indication information types and configuration parameters. The third mapping is transmitted to the terminal device by the network device through a radio resource control (RRC) message. Alternatively, the third mapping is transmitted to the terminal device through a broadcast message by the network device. Still alternatively, the third mapping is pre-agreed, such as agreed in protocols.

Optionally, the first parameter is one of at least two sets of first parameters. The two sets of first parameters are transmitted to the terminal device by the network device through a RRC message. Alternatively, the two sets of first parameters are transmitted to the terminal device by the network device through a broadcast message. Alternatively, the two sets of first parameters are pre-agreed.

At block S202, the terminal device transmits information. The information is used for the network device to determine the CSI indication information and the CSI indication information type.

In some implementations, the terminal device transmits first indication information to the network device, and the first indication information is used for the network device to determine the CSI indication information type; the terminal device transmits second indication information to the network device, and the second indication information is used for the network device to determine the CSI indication information.

The first indication information and the second indication information can be carried in the same signaling, or can be carried in different signaling. The first indication information has a first correspondence with the CSI indication information type. The first correspondence is transmitted to the terminal device by the network device through a RRC message. Or, the first correspondence is transmitted to the terminal device by the network device through a broadcast message. Or, the first correspondence is pre-agreed, such as agreed in protocols.

In case that the CSI indication information type is the length of the CSI indication information, FIG. 6 is an optional schematic diagram illustrating the first correspondence. As illustrated in FIG. 6, M represents the first indication information, where the first indication information includes M1, M2, M3, and M4. The CSI indication information type corresponding to M1 is N1, and N1 represents that the length of the CSI indication information is 256. The CSI indication information type corresponding to M2 is N2, and N2 represents that the length of the CSI indication information is 128. The CSI indication information type corresponding to M3 is N3, and N3 represents that the length of the CSI indication information is 64. The CSI indication information type corresponding to M4 is N4, and N4 represents that the length of the CSI indication information is 32. Optionally, the length of the CSI indication information can be in bytes, or the length of the CSI indication information can be in bits, alternatively, the length of the CSI indication information can be in the number of data.

In case that the CSI indication information type is the size of the matrix representing the CSI indication information and both the number of rows of the matrix and the number of columns of the matrix are each L, FIG. 7 is another optional schematic diagram of the first correspondence. As illustrated in FIG. 7, M represents the first indication information, where the first indication information includes M1, M2, M3, and M4. The CSI indication information type corresponding to M1 is N1, and N1 represents that L=16. The CSI indication information type corresponding to M2 is N2, and N2 represents that L=12. The CSI indication information type corresponding to M3 is N3, and N3 represents that L=8. The CSI indication information type corresponding to M4 is N4, and N2 represents that L=4. Here, the first indication information is used for determining the number of rows or the number of columns of the matrix.

In case that the CSI indication information type is the size of the matrix representing the CSI indication information, and the number of rows of the matrix is L and the number of columns of the matrix is R, FIG. 8 is another optional schematic diagram of the first correspondence. As illustrated in FIG. 8, M represents the first indication information, where the first indication information includes M1, M2, M3, and M4. The CSI indication information type corresponding to M1 is N1, and N1 represents that L=32 and R=16. The CSI indication information type corresponding to M2 is N2, and N2 represents that L=16 and R=8. The CSI indication information type corresponding to M3 is N3, and N3 represents that L=8 and R=4. The CSI indication information type corresponding to M4 is N4, and N4 represents that L=4 and R=2. Here, the first indication information is used for determining the number of rows and the number of columns of the matrix.

With regard to the first correspondence illustrated in FIG. 6 to FIG. 8, in some implementations, the first indication information occupies two bits, M1 is 00, M2 is 01, M3 is 10, and M4 is 11.

Optionally, the CSI indication information type is used for the network device to determine a second parameter. The second parameter is for constructing a decoding model which is used by the network device to obtain the CSI. Alternatively, the second parameter is for constructing an encoding model which is used by the terminal device to generate the CSI indication information. In case that the second parameter is for constructing the encoding model with which the terminal device generates the CSI indication information, the network device determines a parameter(s) corresponding to the encoding model that corresponds to the CSI indication information type, according to a third mapping between CSI indication information types and configuration parameters. Then the network device determines the parameter for constructing a decoding model according to a sixth mapping between configuration parameters corresponding to the encoding model and configuration parameters corresponding to the decoding model. In case that the second parameter is for constructing the decoding model with which the network device obtains the CSI, the network device determines a second parameter corresponding to the CSI indication information type directly according to a correspondence between CSI indication information types and parameters of the decoding model.

In some implementations, the terminal device transmits first indication information to the network device, and the first indication information is used for the network device to determine a second parameter. The terminal device transmits second indication information to the network device, and the second indication information is used for the network device to determine the CSI indication information. The first indication information has a second correspondence with the second parameter. The second correspondence is transmitted to the terminal device by the network device through a RRC message. Alternatively, the second correspondence is transmitted to the terminal device by the network device through a broadcast message. Still alternatively, the second correspondence is pre-agreed, such as agreed in protocols.

FIG. 9 is an optional schematic diagram illustrating the second correspondence. As illustrated in FIG. 9, M represents the first indication information, and the first indication information includes M1, M2, M3, and M4. M1 corresponds to a first set of second parameters N1. M2 corresponds to a second set of second parameters N2. M3 corresponds to a third set of second parameters N3. M4 corresponds to a fourth set of second parameters N4. Optionally, the first indication information occupies two bits, M1 is 00, M2 is 01, M3 is 10, and M4 is 11.

Optionally, the second parameter transmitted to the network device by the terminal device is used for the network device to determine the CSI indication information type. The second parameter is for constructing a decoding model that is used for the network device to obtain the CSI. Alternatively, the second parameter is for constructing an encoding model that is used by the terminal device to generate the CSI indication information. In case that the second parameter is for constructing the encoding model with which the terminal device generates the CSI indication information, the network device determines a CSI indication information type corresponding to the second parameter according to a third mapping between CSI indication information types and configuration parameters. In case that the second parameter is for constructing the decoding model with which the network device obtains the CSI, the network device can determine the CSI indication information type corresponding to the second parameter according to a correspondence between CSI indication information types and parameters of the decoding model. Alternatively, in case that the second parameter is for constructing the decoding model with which the network device obtains the CSI, the network device determines a parameter(s) for constructing the encoding model according to a sixth mapping between configuration parameters corresponding to the encoding model and configuration parameters corresponding to the decoding model, and then determines a corresponding CSI indication information type according to a third mapping between state indication information types and configuration parameters.

Optionally, the encoding model is an encoding neural network model, and the decoding model is a decoding neural network model.

In the above implementations, the second indication information has a third correspondence with the CSI indication information determined by the network device. The third correspondence is transmitted to the terminal device by the network device through a RRC message. Alternatively, the third correspondence is transmitted to the terminal device by the network device through a broadcast message. Still alternatively, the third correspondence is pre-agreed.

In some implementations, the method further includes operations at block S200, that is, the terminal device determines the CSI indication information type. The terminal device can determine the CSI indication information type in at least two manners. The first is, the terminal device determines the CSI indication information type based on the CSI. The second is, the terminal device determines the CSI indication information type based on the CSI and data attribute.

In case that the terminal device determines the CSI indication information type based on the CSI, in some implementations, the terminal device determines the CSI indication information type corresponding to the CSI according to a first mapping between CSI and CSI indication information types. The first mapping is transmitted to the terminal device by the network device through a RRC message. Alternatively, the first mapping is transmitted to the terminal device by the network device through a broadcast message. Still alternatively, the first mapping is pre-agreed.

FIG. 10 is an optional schematic diagram illustrating the first mapping. As illustrated in FIG. 10, the CSI P has a mapping relationship with the CSI indication information type Q and the first indication information. For example, the CSI is represented by signal to interference plus noise ratio (SINR). When SINR≥X1, CSI is P1, and a corresponding CSI indication information type is Q1, which is represented with first indication information M1. When X2≤SINR<X1, CSI is P2, and a corresponding CSI indication information type is Q2, which is represented with first indication information M2. When X3≤SINR<X2, CSI is P3, and a corresponding CSI indication information type is Q3, which is represented with first indication information M3. When X3<SINR, CSI is P4, and a corresponding CSI indication information type is Q4, which is represented with first indication information M4.

In terms of determining the CSI indication information type by the terminal device based on the CSI, in some other implementations, the terminal device determines a first parameter corresponding to the CSI according to a second mapping between CSI and configuration parameters, and then the terminal device determines a CSI indication information type corresponding to the first parameter according to a third mapping between CSI indication information types and configuration parameters. The second mapping and the third mapping are transmitted to the terminal device by the network device through a RRC message. Alternatively, the second mapping and the third mapping are transmitted to the terminal device by the network device through a broadcast message. Still alternatively, the second mapping and the third mapping are pre-agreed.

In terms of determining the CSI indication information type by the terminal device based on the CSI and the data attribute, in some implementations, the terminal device determines a CSI indication information type corresponding to both the CSI and the data attribute based on a fourth mapping between CSI indication information types, CSI, and data attributes. The fourth mapping is transmitted to the terminal device by the network device through a RRC message. Alternatively, the fourth mapping is transmitted to the terminal device by the network device through a broadcast message. Still alternatively, the fourth mapping is pre-agreed. The data attribute includes at least one of: data transmission rate, or service type of data. The service type may include: enhance mobile broadband (eMBB) service and/or ultra-reliable low latency communications (URLLC) service. The fourth mapping may be that, the CSI is P-type CSI, the transmission rate is t-type transmission rate, the service type is r-type service type, and Q-type CSI indication information type is adopted.

In terms of determining the CSI indication information type by the terminal device based on the CSI and the data attribute, in some implementations, the terminal device determines a first parameter corresponding to both the CSI and the data attribute, according to a fifth mapping between configuration parameters, CSI, and data attributes; and then the terminal device determines the CSI indication information type corresponding to the first parameter based on a third mapping between CSI indication information types and configuration parameters. The third mapping and the fifth mapping are transmitted to the terminal device by the network device through a RRC message. Alternatively, the third mapping and the fifth mapping are transmitted to the terminal device by the network device through a broadcast message. Still alternatively, the third mapping and the fifth mapping are pre-agreed. Optionally, the data attribute at least includes data transmission rate and/or service type of the data.

As such, the CSI indication information type is determined by the terminal device, and the terminal device can generate CSI indication information according to the CSI indication information type determined.

In implementations of the disclosure, when the terminal device determines that the channel state quality is good, such as the SINR value of the channel is high, and the terminal device needs high-speed transmission services, then the terminal device determines that the length of the CSI indication information type is 256. On the other hand, when the terminal device determines that the channel state quality is poor, then the terminal device does not need to feed back high-precision indication information, and the terminal device can determine that the length of the CSI indication information type is 32. By determining the type of the CSI indication information according to CSI, the terminal device can effectively use the transmission resources and avoid the waste of transmission resources.

In some implementations, the method further includes the following operations.

At block S200', the terminal device determines the first parameter corresponding to the CSI indication information type according to a third mapping between CSI indication information types and configuration parameters.

Once the CSI indication information type is determined by the terminal device, the terminal device can determine a first parameter corresponding to the CSI indication information type according to a third mapping between CSI indication information types and configuration parameters, where the first parameter is for the terminal device to construct the encoding model.

According to the method for processing CSI, a terminal device generates CSI indication information based on a CSI indication information type and transmits information, where the information is used for a network device to determine the CSI indication information and the CSI indication information type. As such, the terminal device can determine the CSI indication information type according to CSI autonomously and therefore can achieve effective use of resource. Because the CSI indication information type is transmitted to the network device by the terminal device, the network device can know the type of the CSI indication information. According to a parameter corresponding to the first parameter with which the terminal device generates the CSI indication information as well as the CSI indication information type transmitted to the network device by the terminal device, the network device can decode the CSI indication information to obtain the CSI. The error between the CSI obtained by the network device and the CSI determined by the terminal device is very small, and the accuracy in CSI recovery by the network device is improved.

Figure 11:
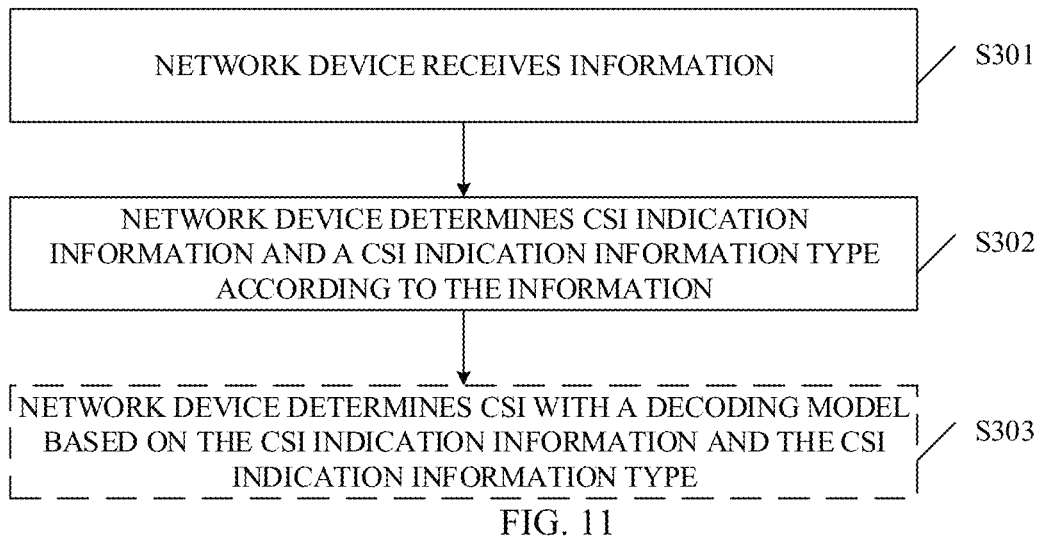
FIG. 11 is a schematic flowchart illustrating a method for processing CSI performed by a network device according to implementations of the disclosure.

One possible procedure of a method for processing CSI, which is applied to a network device, is illustrated in FIG. 11. As illustrated in FIG. 11, the method includes the following.

At block S301, the network device receives information.

In some possible implementations, the network device receives the information from the terminal device. For details of the information, reference can be made to the above operations at block S202, which will not be repeated herein.

At block S302, the network device determines CSI indication information and a CSI indication information type according to the information.

In some implementations, the network device determines the CSI indication information type according to first indication information, and determines a second parameter according to the CSI indication information type. The network device determines the CSI indication information according to second indication information. Optionally, contents contained in the second indication information is the CSI indication information, and the network device can determine the CSI indication information directly according to the second indication information obtained. Alternatively, the second indication information has a third correspondence with the CSI indication information. According to the third correspondence, the network device can determine the CSI indication information corresponding to the second indication information. The first indication information has a first correspondence with the CSI indication information type, and the first correspondence is determined by the network device or is pre-agreed. The third correspondence is determined by the network device or is pre-agreed.

In some other implementations, the network device determines a second parameter based on first indication information, and determines the CSI indication information type according to the second parameter. Then the network device determines the CSI indication information according to the second indication information. The first indication information has a second correspondence with the second parameter, the second correspondence is determined by the network device or is pre-agreed. The second indication information has a third correspondence with the CSI indication information, and the third correspondence is determined by the network device or is pre-agreed.

Optionally, the second parameter is for constructing a decoding model that is used by the network device to determine the CSI. Alternatively, the second parameter is for constructing an encoding model that is used by the terminal device to generate CSI indication information. In case that the second parameter is for constructing the encoding model with which the terminal device generates the CSI indication information, the second parameter is determined by the terminal device based on a third mapping between CSI indication information types and configuration parameters. Based on the second parameter, the network device determines a parameter(s) for constructing the decoding model according to a sixth mapping between configuration parameters corresponding to an encoding model and configuration parameters corresponding to a decoding model with which the network device obtains the CSI. The third mapping and the sixth mapping are determined by the network device. Or, the third mapping and the sixth mapping are pre-agreed.

Figure 12A:
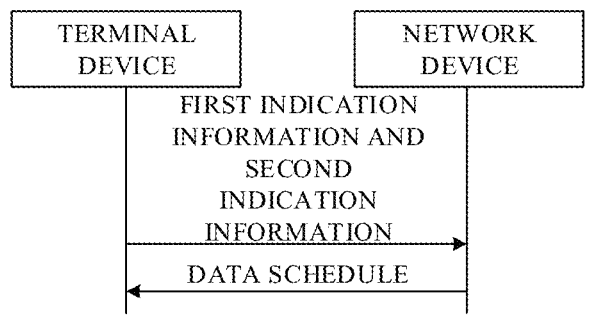
FIG. 12a is a schematic diagram where first indication information and second indication information are located in the same signaling according to implementations of the disclosure.
Figure 12B:
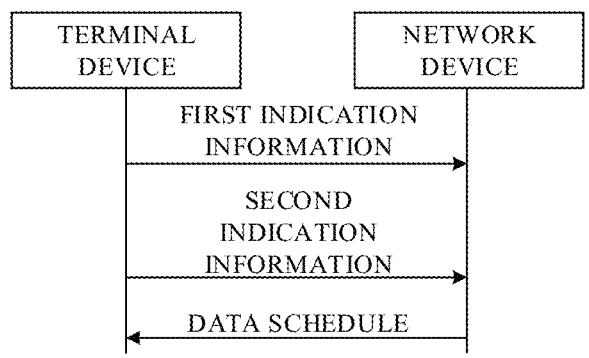
FIG. 12b is a schematic diagram where first indication information and second indication information are located in different signaling according to implementations of the disclosure.

In implementations of the disclosure, the first indication information and the second indication information can be carried in the same signaling or different signaling. FIG. 12a is a schematic diagram where the first indication information and the second indication information are in the same signaling. As illustrated in FIG. 12a, the terminal device transmits signaling to the network device, and the signaling contains the first indication information and the second indication information. The network device schedules data of the terminal device according to the first signaling and the second signaling. FIG. 12b is a schematic diagram where the first indication information and the second indication information are in different signaling. As illustrated in FIG. 12b, the terminal device transmits first signaling and second signaling to the network device, where the first signaling is different from the second signaling. The first signaling contains the first indication information and the second signaling contains the second indication information. The network device schedules data of the terminal device according to the first signaling and the second signaling.

Optionally, the decoding model is a decoding neural network model, and the encoding model is an encoding neural network model.

For details of the CSI indication information, reference can be made to the operations of block S201 and block S202, which will not be repeated herein.

In some implementations, the method further includes operations at block S303: the network device determines the CSI with a decoding model based on the CSI indication information and the CSI indication information type.

In some implementations, the network device determines the CSI by decoding the CSI indication information with a decoding model. The CSI indication information type corresponding to the CSI and determined by the network device is the same as the CSI indication information type indicated to the network device by the terminal device. For example, if the CSI indication information type indicated in the first indication information that is transmitted to the network device by the terminal device is 64, that is, the size of the CSI indication information that is fed back to the network device by the terminal device is 64, and the network device determines that the size of the CSI indication information is 64.

It should be understood that in various implementations of the disclosure, the sequence number of the above processes does not mean the order of execution, and the order of execution of each process shall be determined according to its function and internal logic, and shall not constitute any limitation on the implementation of the disclosure.

Figure 13:
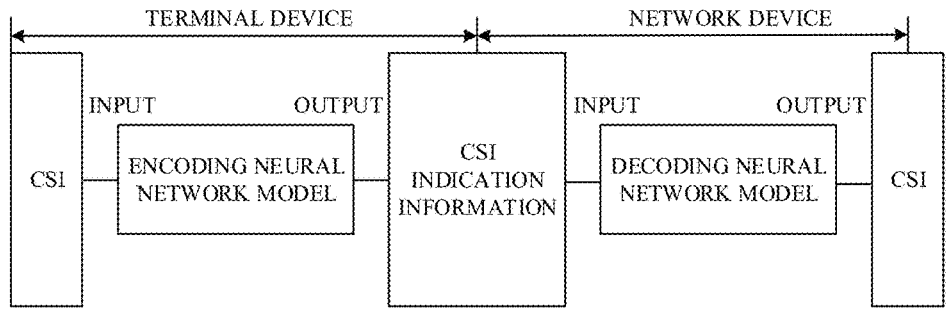
FIG. 13 is a schematic diagram illustrating a network architecture used for the method for processing CSI according to implementations of the disclosure.

A network architecture for the method for processing CSI according to implementations are described below with an example where the terminal device determines the CSI indication information with an encoding neural network model and the network device determines the CSI with a decoding neural network model. As illustrated in FIG. 13, the terminal device uses the CSI as an input of the encoding neural network model, and the CSI indication information output at the encoding neural network model is the feedback vector. The network device uses the feedback vector as the input of the decoding neural network model, and the decoding neural network model outputs the CSI.

By training the encoding neural network model and the decoding neural network model, the size of the CSI indication information that is fed back to the network device by the network device can be determined, which is associated with an error between the CSI determined by the terminal device and the CSI determined by the network device through decoding. The greater the size of the CSI indication information fed back by the terminal device, the smaller the error between the CSI determined by the terminal device and the CSI determined by the network device through decoding. For example, if the CSI indication information fed back by the terminal device is 512 bits, the error between the CSI determined by the terminal device and the CSI determined by the network device through decoding is very small. If the CSI indication information fed back by the terminal device is 64 bits, the error between the CSI determined by the terminal device and the CSI determined by the network device through decoding is small.

Therefore, in implementations of the disclosure, the terminal device can determine the size of the CSI indication information fed back to the network device according to different application scenarios. In a scenario where the error between the CSI determined by the terminal device and the CSI determined by the network device through decoding is small, the terminal device can feed back CSI indication information with larger size to the network device. In a scenario where there is no requirement on the error between the CSI determined by the terminal device and the CSI determined by the network device through decoding, the terminal device can feed back CSI indication information with smaller size to the network device. As such, it is possible to effectively use resources according to the actual application scenario and avoid the ineffective use of resources.

Optionally, in implementations of the disclosure, the encoding neural network model and the decoding neural network model are self-coding neural network models. The CSI is encoded at the encoding neural network model and the output data of the encoding neural network model is used as the input data of the decoding neural network model. The input data is decoded at the decoding neural network model, which is possible to restore the CSI accurately and reduce the error between the CSI input at the encoding neural network model and the CSI output at the decoding neural network model.

Figure 14:
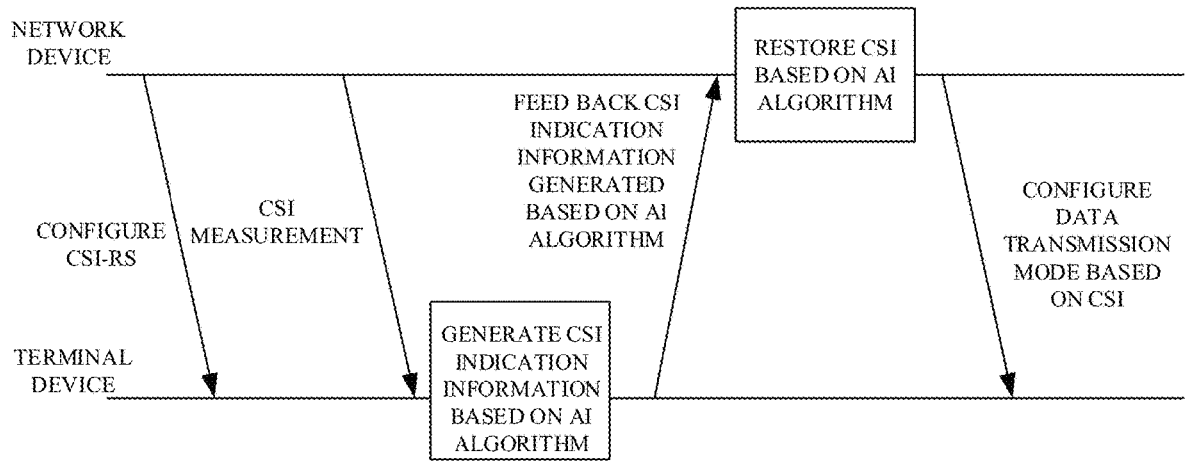
FIG. 14 is a schematic flowchart illustrating a method for processing CSI performed by a communication system according to implementations of the disclosure.

Based on the network architecture of FIG. 13, a method for processing CSI, which is applied to a communication system, is illustrated in FIG. 14. As illustrated in FIG. 14, the network device configures a CSI reference signal for the terminal device, the terminal device performs CSI measurement based on the CSI reference signal to obtain CSI. The terminal device feeds back the CSI indication information type to the network device according to the CSI and feeds back the size of the CSI indication information to the network device. The terminal device uses the CSI as an input of an encoding neural network model, and the encoding neural network model outputs CSI indication information. That is, the terminal device generates CSI indication information based on the CSI with an artificial intelligence (AI) algorithm. The terminal device transmits the CSI indication information to the network device. The network device uses the CSI indication information as the input of a decoding neural network model, and the decoding neural network model outputs CSI. That is, the network device restores the CSI based on the CSI indication information with aid of an AI algorithm. The network device configures a data transmission mode for the terminal device according to the CSI.

The CSI referred to herein includes but is not limited to SINR, signal to noise ratio (SNR), block error rate (BLER), and reference signal receiving quality (RSRQ). The CSI can be any parameter that can represent channel quality.

Figure 15:
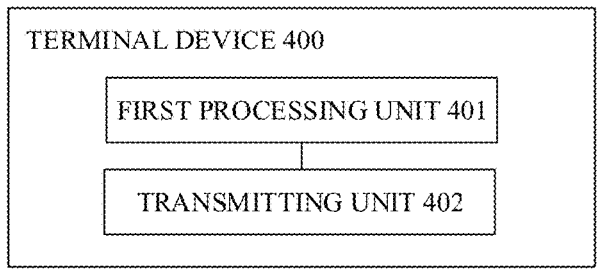
FIG. 15 is a schematic structural diagram illustrating components of a terminal device according to implementations of the disclosure.

To implement the above method for processing CSI, a terminal device is provided. FIG. 15 illustrating the terminal device 400. As illustrated in FIG. 15, the terminal device 400 includes a first processing unit 401 and a transmitting unit 402.

The first processing unit 401 is configured to generate CSI indication information based on a CSI indication information type.

The transmitting unit 402 is configured to transmit information, where the information is used for a network device to determine the CSI indication information and the CSI indication information type.

In some implementations, the first processing unit 401 is further configured to determine the CSI indication information type based on CSI.

In some implementations, the first processing unit 401 is configured to determine a CSI indication information type corresponding to the CSI according to a first mapping between CSI and CSI indication information types.

In some implementations, the first processing unit is configured to determine a first parameter corresponding to the CSI according to a second mapping between CSI and configuration parameters. The first processing unit is configured to determine a CSI indication information type corresponding to the first parameter according to a third mapping between CSI indication information types and configuration parameters.

In some implementations, the first processing unit 401 is further configured to determine the CSI indication information type based on CSI and a data attribute.

In some implementations, the first processing unit 401 is further configured to determine a CSI indication information type corresponding to the CSI and the data attribute according to a fourth mapping between CSI indication information types, CSI, and data attributes.

In some implementations, the first processing unit 401 is further configured to determine a first parameter corresponding to the CSI indication information type according to a third mapping between CSI indication information types and configuration parameters, where the first parameter is used for the terminal device to construct an encoding model.

In some implementations, the first processing unit is further configured to determine a first parameter corresponding to the CSI and the data attribute according to a fifth mapping between configuration parameters, CSI, and data attributes. The first processing unit is further configured to determine a CSI indication information type corresponding to the first parameter according to a third mapping between CSI indication information types and configuration parameters.

In some implementations, the data attribute at least includes at least one of: data transmission rate, or service type of data.

In some implementations, the first parameter is one of at least two sets of first parameters. The two sets of first parameters are transmitted to the terminal device by the network device through a RRC message. Alternatively, the two sets of first parameters are transmitted to the terminal device by the network device through a broadcast message. Still alternatively, the two sets of first parameters are pre-agreed.

In some implementations, the CSI indication information type includes: length of CSI indication information, or size of a matrix representing the CSI indication information.

In some implementations, the matrix representing the CSI indication information is a square matrix, and the size of the matrix includes the number of rows of the matrix or the number of columns of the matrix. Alternatively, the matrix representing the CSI indication information is a non-square matrix, and the size of the matrix includes the number of rows of the matrix and the number of columns of the matrix.

In some implementations, the transmitting unit 402 is configured to transmit first indication information and second indication information to the network device. The first indication information is used for the network device to determine the CSI indication information type. The second indication information is used for the network device to determine the CSI indication information. The CSI indication information is used for the network device to determine a second parameter. The first indication information has a first correspondence with the CSI indication information type. The first correspondence is transmitted to the terminal device by the network device through a RRC message. Alternatively, the first correspondence is transmitted to the terminal device by the network device through a broadcast message. Still alternatively, the first correspondence is pre-agreed.

In some implementations, the transmitting unit 402 is configured to transmit first indication information and second indication information to the network device. The first indication information is used for the network device to determine a second parameter. The second indication information is used for the network device to determine the CSI indication information. The second parameter is used for the network device to determine the CSI indication information type. The first indication information has a second correspondence with the second parameter. The second correspondence is transmitted to the terminal device by the network device through a RRC message. Alternatively, the second correspondence is transmitted to the terminal device by the network device through a broadcast message. Still alternatively, the second correspondence is pre-agreed.

In some implementations, the first indication information and the second indication information are carried in the same or different signaling.

In some implementations, the second parameter is used for the network device to construct a decoding model for obtaining the CSI. Alternatively, the second parameter is used for the terminal device to construct an encoding model for generating the CSI indication information and used for the network device to determine, according to a sixth mapping between configuration parameters corresponding to the encoding model and configuration parameters corresponding to the decoding model, parameters of a decoding model for obtaining the CSI.

In some implementations, the second indication information has a third correspondence with the CSI indication information determined by the network device. The third correspondence is transmitted to the terminal device by the network device through a RRC message. Alternatively, the third correspondence is transmitted to the terminal device by the network device through a broadcast message. Still alternatively, the third correspondence is pre-agreed.

In some implementations, the encoding model includes an encoding neural network model, and the decoding model includes a decoding neural network model.

In some implementations, the first mapping, the second mapping, the third mapping, the fourth mapping, the fifth mapping, and the sixth mapping each can be transmitted to the terminal device by the network device through a RRC message. Alternatively, the first mapping, the second mapping, the third mapping, the fourth mapping, the fifth mapping, and the sixth mapping each can be transmitted to the terminal device by the network device through a broadcast message. Still alternatively, the first mapping, the second mapping, the third mapping, the fourth mapping, the fifth mapping, and the sixth mapping each can be pre-agreed.

Figure 16:
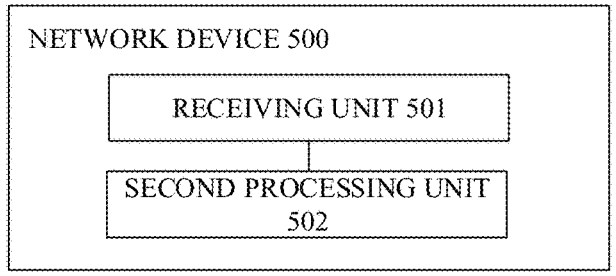
FIG. 16 is a schematic structural diagram illustrating components of a network device according to implementations of the disclosure.

To implement the above method for processing CSI, a network device is provided. FIG. 16 illustrating a network device 500. As illustrated in FIG. 16, the network device 500 includes a receiving unit 501 and a second processing unit 502.

The receiving unit 501 is configured to receive information.

The second processing unit 502 is configured to determine CSI indication information and a CSI indication information type according to the information.

In some implementations, the second processing unit 502 is further configured to determine CSI with a decoding model according to the CSI indication information and the CSI indication information type.

In some implementations, the second processing unit 502 is configured to determine the CSI indication information type according to first indication information, determine a second parameter according to the CSI indication information, and determine the CSI indication information according to second indication information.

In some implementations, the first indication information has a first correspondence with the CSI indication information type, and the first correspondence is determined by the network device or pre-agreed.

In some implementations, the second processing unit 502 is configured to determine a second parameter according to first indication information, determine the CSI indication information type according to the second parameter, and determine the CSI indication information according to second indication information.

In some implementations, the first indication information has a second correspondence with the second parameter, and the second correspondence is determined by the network or pre-agreed.

In some implementations, the second parameter is used for the network device to construct a decoding model for obtaining the CSI, or the second parameter is used for the terminal device to construct an encoding model for generating the CSI indication information.

In some implementations, when the second parameter is used for the terminal device to construct the encoding model for generating the CSI indication information, the second parameter is determined by the terminal device according to a third mapping between CSI indication information types and configuration parameters.

In some implementations, the second processing unit 502 is further configured to determine parameters for constructing a decoding model, based on the second parameter and a sixth mapping, where the sixth mapping is a mapping between configuration parameters corresponding to an encoding model and configuration parameters corresponding to the decoding model used by the network device to obtain the CSI.

In some implementations, the second indication information has a third correspondence with the CSI indication information determined by the network device, where the third correspondence is determined by the network device or pre-agreed.

In some implementations, the CSI indication information type is determined by the terminal device according to a first mapping between CSI and CSI indication information types.

In some implementations, the CSI indication information type is determined by the terminal device according to a fourth mapping between CSI indication information types, CSI, and data attributes.

In some implementations, the data attribute at least includes at least one of: data transmission rate, or service type of data.

In some implementations, the CSI indication information type includes: length of CSI indication information, or size of a matrix representing the CSI indication information.

In some implementations, the second processing unit 502 is further configured to determine parameters for constructing a decoding model, based on the second parameter and a sixth mapping, where the sixth mapping is a mapping between configuration parameters corresponding to an encoding model and configuration parameters corresponding to the decoding model used by the network device to obtain the CSI.

In some implementations, the first mapping, the second mapping, the third mapping, the fourth mapping, the fifth mapping, and the sixth mapping each can be determined by the network device or pre-agreed.

In some implementations, the matrix representing the CSI indication information is a square matrix, and the size of the matrix includes the number of rows of the matrix or the number of columns of the matrix. Alternatively, the matrix representing the CSI indication information is a non-square matrix, and the size of the matrix includes the number of rows of the matrix and the number of columns of the matrix.

A terminal device is provided in implementations of the disclosure. The terminal device includes a processor and a memory for storing computer programs. The computer programs, when executed by the processor, are operable with the processor to perform the foregoing method for processing CSI which is performed by the terminal device.

A network device is provided in implementations of the disclosure. The network device includes a processor and a memory for storing computer programs. The computer programs, when executed by the processor, are operable with the processor to perform the foregoing method for processing CSI which is performed by the network device.

Figure 17:
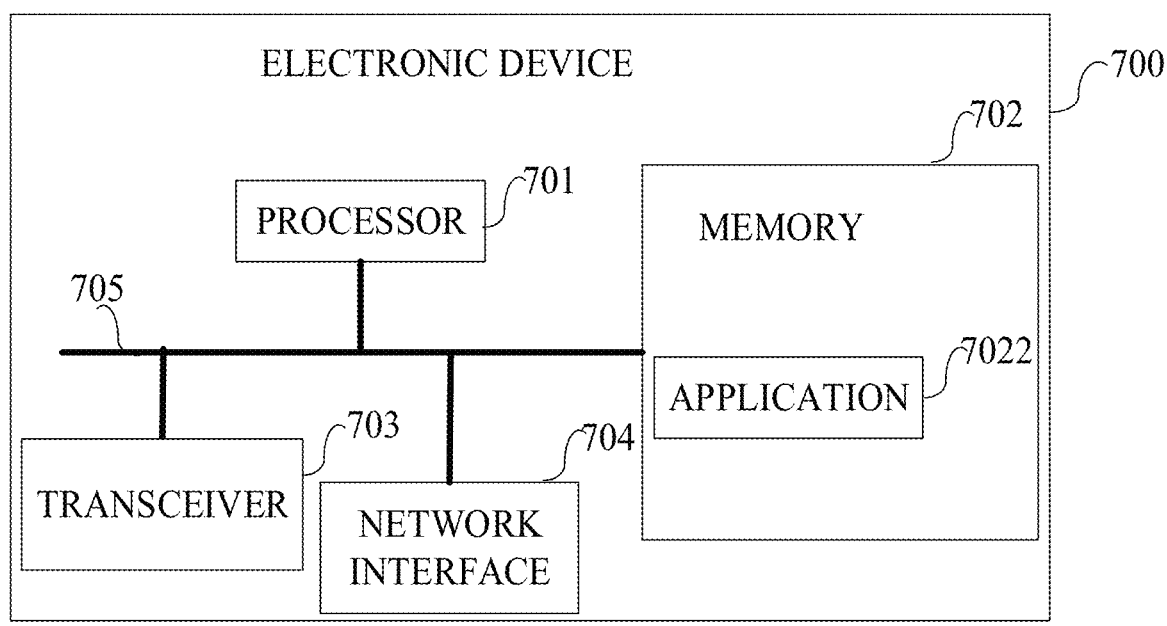
FIG. 17 is a schematic structural diagram illustrating hardware of an electronic device according to implementations of the disclosure.

FIG. 17 is a schematic structural diagram illustrating hardware of an electronic device (a terminal device or a network device) 700 according to implementations. The electronic device 700 includes: at least one processor 701, a memory 702, a transceiver 703, and at least one network interface 704. Various components of the electronic device 700 are coupled together via a bus system 705. It can be understood that, the bus system 705 is configured for connection and communication between these components. In addition to a data bus, the bus system 705 further includes a power bus, a control bus, and a status signal bus. However, for the clarity of description, various buses are marked as the bus system 705 in FIG. 17.

It can be understood that, the memory 702 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc (CD), a compact disc read-only memory (CD-ROM). The magnetic surface memory may be a magnetic disk memory or a magnetic tape memory. The volatile memory can be a random access memory (RAM) that acts as an external cache. By way of example but not limitation, many forms of RAM are available, such as a static random access memory (SRAM), a synchronous static random access memory (SSRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM). The memory 702 described herein is intended to include, but is not limited to, these and any other suitable types of memory.

The memory 702 of implementations is configured to store various types of data to support operations of the electronic device 700. Examples of these data include: any computer program operating on the electronic device 700, such as an application 7022. The application 7022 may include programs implementing the method of implementations.

The methods disclosed in the above implementations can be applied to the processor 701 or implemented by the processor 701. The processor 701 may be an integrated circuit chip with signal processing capabilities. During implementation, each step of the foregoing method may be completed by an integrated logic circuit in the form of hardware or an instruction in the form of software in the processor 701. The processor 701 may be a general-purpose processor, a digital signal processor (DSP), or other programmable logic devices, discrete gates or transistor logic devices, or discrete hardware components. The processor 701 can implement or execute the methods, steps, and logic blocks disclosed in implementations. The general purpose processor may be a microprocessor, or any conventional processors or the like. The steps of the method disclosed in implementations may be implemented through a hardware decoding processor, or may be performed by hardware and software modules in the decoding processor. The software module can be located in a storage medium. The storage medium is located in the memory 702. The processor 701 reads the information in the memory 702, and completes the steps of the method described above with the hardware of the processor.

In exemplary implementations, the terminal device 700 is configured to perform the foregoing methods, implemented by one or more application specific integrated circuits (ASICs), DSPs, programmable logic devices (PLDs), complex programmable logic devices (CPLDs), field-programmable gate arrays (FPGAs), general purpose processors, controllers, micro-controller units (MCUs), micro-processor units (MPUs), or other electronic components.

Implementations further provide a storage medium. The storage medium is configured to store computer programs.

The storage medium is applicable to the terminal device of implementations. The computer programs are operable with a computer to implement the operations in the foregoing methods performed by the terminal device, which will not be repeated herein for the sake of simplicity.

Alternatively, the storage medium is applicable to the network device of implementations. The computer programs are operable with a computer to implement the operations in the foregoing methods performed by the network device, which will not be repeated herein for the sake of simplicity.

The disclosure is described herein with reference to schematic flow charts and/or block diagrams of methods, apparatuses (systems), and computer program products according to the implementations of the disclosure. It should be understood that each flow and/or block in the flow chart and/or block diagram, and a combination of flow and/or block in the flow chart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flow chart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flow chart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flow chart and/or one or more blocks in the block diagram.

The above is only an implementation of the disclosure and is not intended to limit the scope of protection of the disclosure. Any modification, equivalent arrangements and improvement made within the spirit and principles of the disclosure shall be included in the scope of protection of the disclosure.

What is claimed is:

1. A method for processing channel state information (CSI), comprising:
  determining, by a terminal device, a CSI indication information type based on CSI comprises;
  determining, by the terminal device, a first parameter corresponding to the CSI according to a second mapping between CSI and configuration parameters; and
  determining, by the terminal device, a CSI indication information type corresponding to the first parameter according to a third mapping between CSI indication information types and configuration parameters;
  generating, by a terminal device, CSI indication information based on the CSI indication information type; and
  transmitting information by the terminal device, wherein the information is used for a network device to determine the CSI indication information and the CSI indication information type.

2. A terminal device, comprising:
  a transceiver;
  a processor;
  a memory storing computer programs which, when executed by the processor, are operable with the processor to:
  determine a CSI indication information type based on CSI by:
  determining a first parameter corresponding to the CSI according to a second mapping between CSI and configuration parameters; and
  determining a CSI indication information type corresponding to the first parameter according to a third mapping between CSI indication information types and configuration parameters;
  generate channel state information (CSI) indication information based on the CSI indication information type; and
  wherein the computer programs, when executed by the processor, are operable with the transceiver to transmit information, wherein the information is used for a network device to determine the CSI indication information and the CSI indication information type.

3. A network device, comprising:
  a transceiver;
  a processor; and
  a memory storing computer programs which, when executed by the processor, are operable with the transceiver to receive information; and
  wherein the computer programs, when executed by the processor, are operable with the processor to determine channel state information (CSI) indication information and a CSI indication information type according to the information, wherein the CSI indication information type is determined by: determining a first parameter corresponding to the CSI according to a second mapping between CSI and configuration parameters; and determining a CSI indication information type corresponding to the first parameter according to a third mapping between CSI indication information types and configuration parameters.

4. The network device of claim 3, wherein the computer programs are further operable with the processor to determine CSI with a decoding model according to the CSI indication information and the CSI indication information type.

5. The network device of claim 3, wherein the computer programs are further operable with the processor to:
   determine the CSI indication information type according to first indication information; and
   determine the CSI indication information according to second indication information.

6. The network device of claim 3, wherein the computer programs are further operable with the processor to:
   determine a second parameter according to first indication information;
   determine the CSI indication information type according to the second parameter; and
   determine the CSI indication information according to second indication information.

7. The method of claim 1, wherein the CSI indication information type comprises: length of the CSI indication information, or size of a matrix representing the CSI indication information.

8. The terminal device of claim 2, wherein the CSI indication information type comprises: length of the CSI indication information, or size of a matrix representing the CSI indication information.

9. The network device of claim 3, wherein the CSI indication information type comprises: length of the CSI indication information, or size of a matrix representing the CSI indication information.

* * * * *